United States Patent
Jarvis et al.

(10) Patent No.: US 6,182,443 B1
(45) Date of Patent: Feb. 6, 2001

(54) METHOD FOR CONVERTING EXHAUST GASES FROM A DIESEL ENGINE USING NITROGEN OXIDE ABSORBENT

(75) Inventors: Mottlene Jarvis, Lincoln University, PA (US); Karen Marie Adams, Dearborn Heights, MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/248,189

(22) Filed: Feb. 9, 1999

(51) Int. Cl.[7] .................................................. F01N 3/28
(52) U.S. Cl. .................................................. 60/274; 60/299
(58) Field of Search ............................ 60/274, 299, 301; 422/174; 55/DIG. 30

(56) References Cited

U.S. PATENT DOCUMENTS

| | | | |
|---|---|---|---|
| 4,985,210 | * | 1/1991 | Minami ................................ 422/171 |
| 5,125,231 | * | 6/1992 | Patil et al. ............................ 60/274 |
| 5,269,140 | * | 12/1993 | Take et al. ........................... 60/274 |
| 5,388,406 | * | 2/1995 | Takeshima et al. .................. 60/297 |
| 5,455,012 | * | 10/1995 | Machida et al. ..................... 422/171 |
| 5,473,887 | * | 12/1995 | Takeshima et al. .................. 60/276 |
| 5,649,421 | * | 7/1997 | Wakabayashi et al. .............. 60/299 |
| 5,943,857 | * | 8/1999 | Ansell et al. ........................ 60/274 |

FOREIGN PATENT DOCUMENTS

| | | | |
|---|---|---|---|
| 560991 | | 9/1993 | (EP) . |
| 54-52213 | * | 4/1979 | (JP) . |
| 61-112715 | | 5/1986 | (JP) . |
| 62-106844 | * | 5/1987 | (JP) . |
| 62-106826 | | 5/1987 | (JP) . |
| 62-136245 | * | 6/1987 | (JP) . |
| 5-240034 | * | 9/1993 | (JP) . |
| 6-336 | * | 1/1994 | (JP) . |
| 7-166854 | * | 6/1995 | (JP) . |
| 9-85054 | * | 3/1997 | (JP) . |
| 10-156144 | * | 6/1998 | (JP) . |
| 11-13462 | * | 1/1999 | (JP) . |
| 9743031 | * | 11/1997 | (WO) . |

OTHER PUBLICATIONS

Masakazu Iwamoto, Tetsu Zengyo, Angel M. Hernandez, Hirotaka Araki, "Intermediate addition of reductant between an oxidation and a reduction catalyst for highly selective reduction of NO in excess oxygen," Applied Catalysis B: Environmental 17 (1998) 259–266.

Hideaki Hamada, "Cooperation of catalytic species for the selective reduction of nitrogen monoxide with hydrocarbons," Catalysis Surveys from Japan 1 (1997) 53–60.

Karen M. Adams, John V. Cavataio, Robert H. Hammerle, Applied Catalysis B: Environmental 10 (1996) 157–181.

* cited by examiner

Primary Examiner—John A. Jeffery
(74) Attorney, Agent, or Firm—Killworth, Gottman, Hagan & Schaeff LLP

(57) ABSTRACT

The invention is a method of treating exhaust gases generated by a diesel engine by locating two catalyst components in the engine exhaust gas passage. The first catalyst component which exposed to oxidizing diesel exhaust is located nearest to the engine and is a nitrogen oxide absorbent made of support material carrying precious metal. The second component is a catalyst such as a lean-NOx catalyst or a selective reduction catalyst which is capable of converting the exhaust gas passing over it including reducing the nitrogen oxides desorbed from the first component into nitrogen ($N_2$) or nitrous oxide ($N_2O$). Materials like hydrocarbons or ammonia or urea may be injected into the vicinity of the second catalyst component to aid in the reduction.

15 Claims, 2 Drawing Sheets

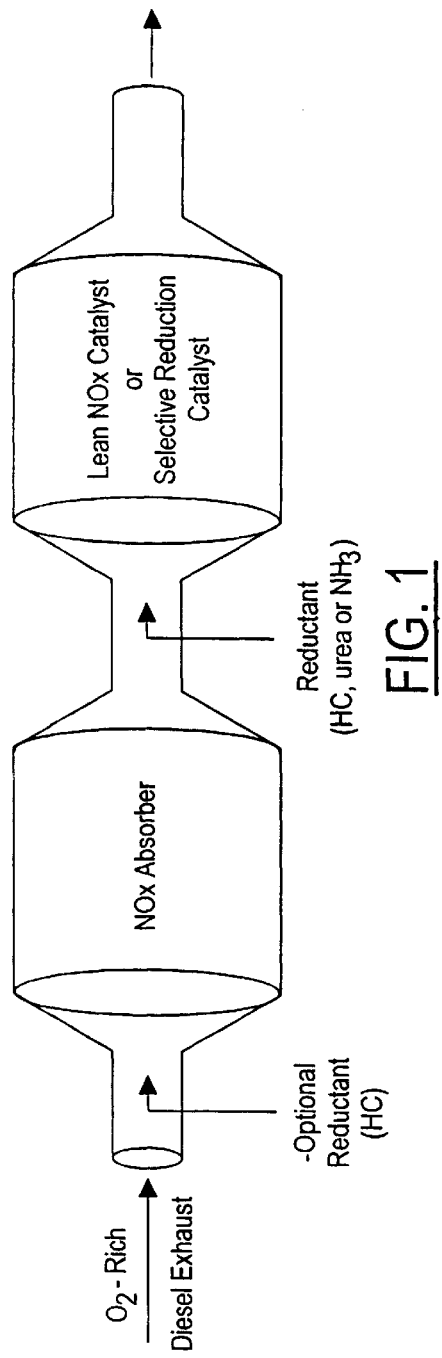
FIG. 1
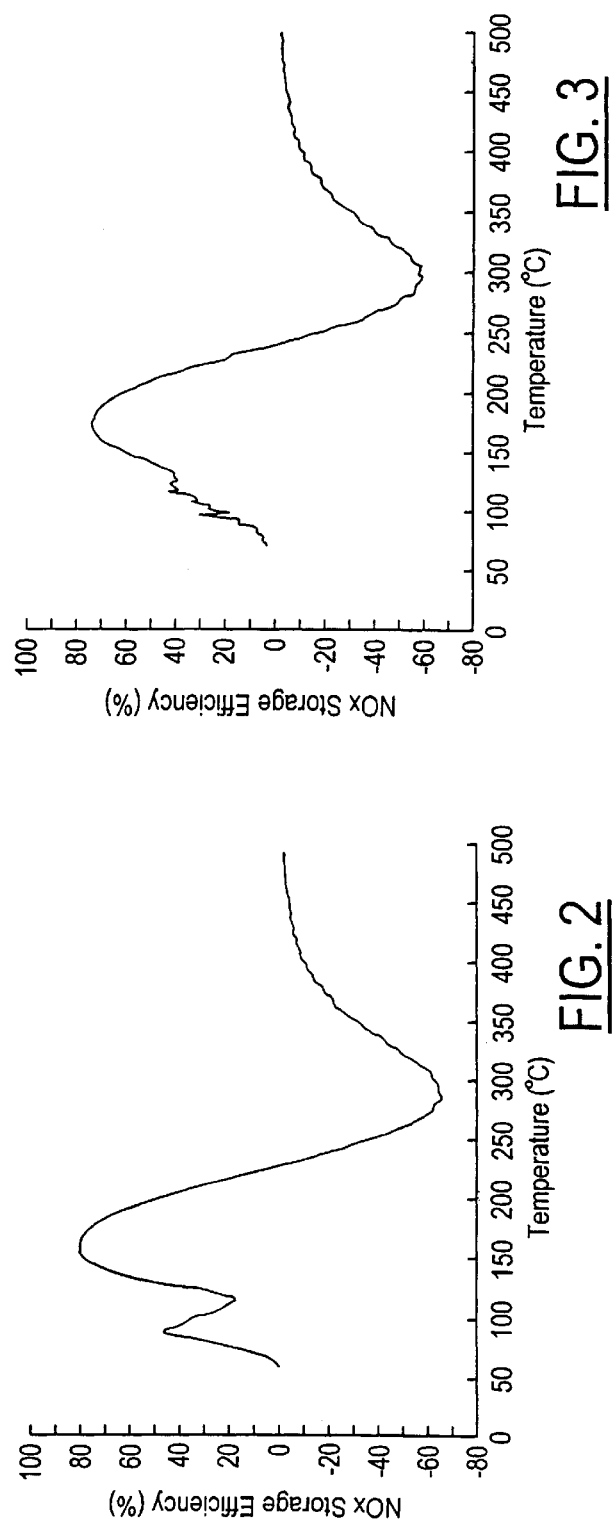
FIG. 2
FIG. 3

METHOD FOR CONVERTING EXHAUST GASES FROM A DIESEL ENGINE USING NITROGEN OXIDE ABSORBENT

Reference is made to U.S. patent application Ser. No. 08/992,943 filed Dec. 18, 1997 entitled "Use of Platinum/Alumina Nitrogen Oxide Absorbents for Automotive Emission Reduction" commonly assigned herewith.

FIELD OF THE INVENTION

This invention relates to a method of treating diesel engine exhaust gases with two catalyst components located in the exhaust gas passage. The first component material made of precious metal on a particular porous support absorbs nitrogen oxides at low temperatures and desorbs them as the temperature is raised during engine operation. The second component, located downstream of the first component, is a catalyst capable of reducing the desorbed nitrogen oxides, such as a lean-NOx catalyst or a selective catalytic reduction (SCR) catalyst.

BACKGROUND OF THE INVENTION

Catalysts are employed in the exhaust system of diesel vehicles to oxidize carbon monoxide (CO) and hydrocarbons (HC), including the volatile organic fraction of particulates, produced during engine operation into carbon dioxide ($CO_2$). Current diesel after-treatment technologies are being developed to convert nitrogen oxides (NOx), in addition to the other emissions, into more desirable gases. These technologies involve lean NOx catalysts, selective catalytic reduction (SCR) catalysts, and lean NOx traps.

Lean NOx catalysts are catalysts that convert NOx in a lean, i.e., $O_2$-rich, environment with the aid of low levels of hydrocarbons. In the case of diesel, hydrocarbon emissions are too low to achieve significant lean NOx conversion, so hydrocarbons need to be added by injection of diesel fuel into the pre-catalyst exhaust stream. Diesel lean NOx catalysts generally include such materials as e.g., precious metals or base metal zeolites. In particular, platinum is used because of its lean NOx activity at low temperatures, i.e., usually less than 230° C. This low temperature activity is needed, e.g., during European urban-type driving where diesel exhaust gas temperatures typically measure between 100–300° C. at the engine exhaust manifold. Overall diesel catalysts need to be able to operate over a wide temperature range, e.g., up to 500° C. Base metal zeolites and precious metal other than Pt have lean NOx activity at higher temperatures, usually greater than 230° C. Precious metal and base metal zeolite materials are deficient, however, because they have a limited temperature range of lean NOx activity and a limited level of NOx conversion over their active temperature range. Platinum has an additional shortcoming of reducing NOx predominantly to $N_2O$ rather than $N_2$.

Selective reduction catalysts (SCR), in contrast to using hydrocarbons for NOx conversion, use urea or ammonia to provide NOx conversion in $O_2$-rich exhaust. Base metal zeolite materials are used for SCR catalysts on diesel vehicle. SCR catalysts provide much higher NOx conversion than lean NOx catalysts. However, similar to lean NOx catalysts, SCR catalysts are deficient because they have a limited temperature range of operation. Their NOx conversion activity is usually confined to temperatures greater than 230° C.

NOx traps operate on lean-burn gasoline vehicles by absorbing NOx on a material like barium oxide during lean-burn operation, i.e., engine air/fuel (A/F) ratio is ca. 20/1 and exhaust is $O_2$-rich. Then, the NOx trap is subjected to engine exhaust during stoichiometric or fuel-rich operation, i.e., A/F ratio is 14.7 or lower and exhaust becomes $O_2$ deficient. This is done to desorb the NOx and convert it over precious metal in the trap formulation. In diesel systems, the exhaust gases generated by the engine are always oxidizing, i.e., lean, the engine A/F ratio being generally from 20/1 to 60/1. Using a NOx trap like barium oxide on alumina described above is unlikely with a diesel engine. This is because it is impractical to run the engine fuel-rich or near stoichiometric to release and reduce NOx. Hence, using such NOx traps in gasoline lean-burn engine exhaust systems is more commercially appropriate since the air/fuel ratio can more conveniently be made stoichiometric or fuel-rich.

The present invention method overcomes deficiencies of prior diesel exhaust purification methods and provides a catalyst system capable of efficiently reducing nitrogen oxides as well as oxidizing hydrocarbons and carbon monoxide in the relatively cool oxidizing conditions of diesel exhaust gases.

DISCLOSURE OF THE INVENTION

The invention is an exhaust gas treatment system for diesel engine exhaust. It comprises a first catalyst component which contains a nitrogen oxide absorbent material, and is located in an exhaust gas passage of a diesel engine. The system also comprises a second catalyst component which contains a lean-NOx catalyst or a selective reduction catalyst, and is located downstream of the first component. The nitrogen oxide absorbent material comprises (a) porous support material selected from the group consisting of alumina, zeolite, zirconia, titania, lanthana, and mixtures of any of them and (b) at least 0.1 wt. % precious metal selected from the group consisting of platinum, palladium, and rhodium or a mixture of any of them based on the weight of a support for the precious metal. In the system, the diesel exhaust gas flowing into said first component material is always oxidizing. At low temperatures the first component material absorbs nitrogen oxides from the exhaust gas. These absorbed nitrogen oxides are released from the absorbent material at higher temperatures and converted to nitrogen ($N_2$) or nitrous oxide ($N_2O$) over the second catalyst component. The second component may be a lean-NOx catalyst or SCR catalyst.

Preferably the precious metal of the first component includes platinum and its support is alumina. The specific temperature ranges of NOx storage and of NOx release of the first component catalyst will depend on it particular formulation. In some instances, the NOx will be absorbed at temperatures of up to about 230° C. and be released above that temperature to travel to the second component for reduction.

In another aspect, this invention is a method for treating diesel exhaust gases which involves the system disclosed above where the oxidizing diesel exhaust gases pass through the first component with NOx being absorbed at low temperatures and later desorbed at elevated temperatures to be reduced over the second component.

For optimum operation, the amount of nitrogen oxide absorbed on the first component may be monitored so that the NOx absorbed on the first component material can be desorbed by elevating the temperature before the material has reached capacity for nitrogen oxide absorption. Advantageously, however, diesel exhaust temperatures during typical driving, exemplified in the MVEuro cycle, are within the range of NOx desorption often enough that NOx storage capacity in the first component is not likely to be reached.

BRIEF DESCRIPTION OF THE DRAWINGS

FIG. 1 is a schematic of the invention.

FIG. 2 is a graph showing the NOx storage efficiency and release as a function of gas sample temperature for a Pt/alumina first component embodiment according to the present invention.

FIG. 3 and FIG. 4 are graphs showing NOx storage and conversion efficiency for the first component materials of FIG. 2 using increased hydrocarbon content in the gas sample.

DESCRIPTION OF PREFERRED EMBODIMENTS

Figure 4:
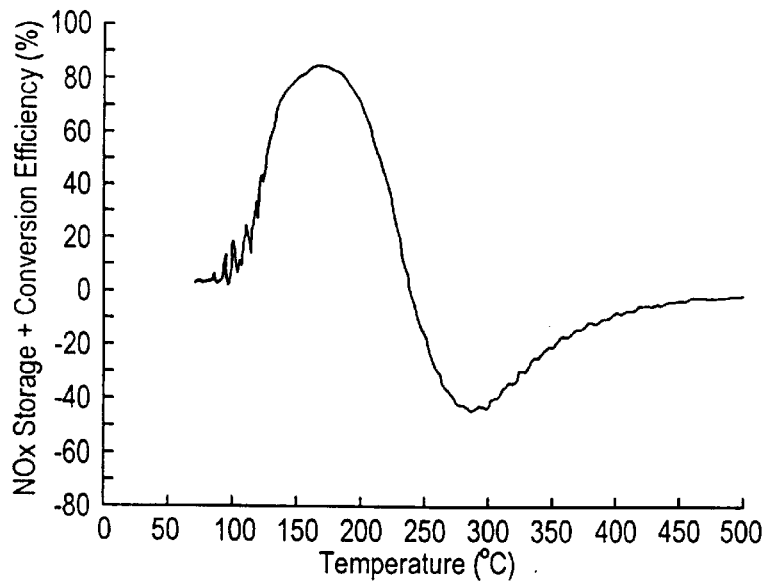

The invention method comprises locating two catalyst components in the exhaust passage of a diesel engine exhaust gas passage, the first component being located closer to the engine manifold. The first component is a material which, during diesel engine operation, is exposed to exhaust gases which are always oxidizing. During the relatively cool operating temperatures as during engine start up, light acceleration and low speed-load cruises, as particularly takes place during urban driving, the NOx present in the oxidizing exhaust is absorbed on the first component material. Later when the first component is exposed to higher temperatures as during increased load of urban and highway driving, the absorbed NOx desorbs from the first component in the presence of the oxidizing exhaust and is carried in the gas stream to the second component for reduction as over a lean-NOx catalyst or SCR catalyst. The first component can be positioned to contact engine out gases immediately after they exit e.g., the exhaust manifold, or a turbocharger, or other exhaust after-treatment equipment such as a particulate filter. A schematic of this invention is shown in FIG. 1.

We have found that, e.g., platinum on alumina stores and releases NOx under $O_2$ rich conditions, and at exhaust gas temperatures typical of diesel light-duty vehicle driving, e.g., on a standard drive cycle such as MVEuro. This NOx storage occurs over the same low temperatures where Pt is active for lean NOx reduction. Operation of lean-NOx catalysts on diesels typically requires reductant added to the exhaust gases because engine out HC levels are too low. When no HC is present, Pt/alumina stores NOx. When HC is added, both NOx storage and lean NOx reduction occur simultaneously. Stored NOx is released as the temperature is elevated above the NOx storage temperature of the first component, which varies with the component's particular composition.

One embodiment of the invention system involves the use of, e.g., Pt/alumina as the first component that stores NOx at low temperatures, followed in the exhaust stream by a lean NOx catalyst that converts NOx over the higher temperatures where the Pt/alumina of the first component releases NOx. The lean NOx catalyst converts both released NOx and NOx emitted from the engine over its active temperature range. The benefit is the temperature range of the lean NOx catalyst is effectively widened to include the active temperature ranges of both components. A second embodiment of the present invention involves the use of the same two components with a modification which allows the use of the first component, e.g., Pt/alumina, for both storage and conversion of NOx. This is done by injecting HC into the exhaust to produce lean NOx reduction in the first component. (Even with the added hydrocarbons, however, the gas reacted over the first component would still be $O_2$-rich, usually several orders of magnitude in excess of a stoiciometric $O_2$ level.) In such a system, a lean NOx catalyst which follows the first component reduces released NOx. This conversion of released NOx effectively improves the level of NOx conversion for Pt/alumina. Still a third embodiment of the present invention involves a low temperature NOx storage catalyst, like Pt/alumina, with an SCR catalyst, i.e., one that uses urea or ammonia as reductant. Abatement of NOx (through absorption on the first catalyst component) will be provided over low temperatures where an SCR catalyst individually cannot operate, or where it may not be desirable to operate an SCR catalyst. As a fourth embodiment, Pt/alumina in the third embodiment could be operated similar to the second embodiment to additionally provide NOx conversion in addition to NOx storage if desired as by the addition of a source of hydrocarbons to the first component. In all of these present invention embodiment systems, using the two components allows for the eventual reduction of NOx emitted from the engine at low temperatures. Although a single Pt-based lean NOx catalyst would be effective for converting NOx at low temperatures, however, $N_2O$ is predominantly the product. Alternatively, when Pt/alumina is the first of the two component system of the present invention, NOx is stored at low temperatures on this first component and later reduced to the more desirable $N_2$ over a second component such as Cu—ZSM-5. The exhaust gas treatment system of the present invention exhibits optimal operation with diesel fuels having an absence of sulfur.

The first component, provided to absorb the nitrogen oxides present in the diesel exhaust gas at low temperatures, is particularly made of precious metal on a porous support. The porous support material is selected from the group consisting of alumina, zeolite, zirconia, titania, lanthana, and mixtures of any of them, where the alumina is preferably gamma-alumina. The support carries at least 0.1 wt. % precious metal based on the weight of the support. The precious metal is selected from the group consisting of platinum, palladium, and rhodium, or a mixture of any of them. Preferably, the precious metal is at least platinum.

The present invention NOx absorbent, contrary to those conventionally used, does not use alkali metals (e.g., potassium) or alkaline earth material (e.g., barium oxide or strontium oxide) for the absorbent. Rather, we find that the present invention support material of the first component, e.g., gamma-alumina, absorbs the NOx through the catalytic effect of the precious metal.

As described above, the support may be one or a mixture of any of the above disclosed support materials. Preferably the support is mostly gamma-alumina. By "mostly γ-alumina" in this invention is meant that the support material comprises more than about 50% by weight γ-alumina. More preferably the support is greater than 80%, and most preferably substantially all γ-alumina. In addition to the γ-alumina, however, if desired the γ-alumina support material may comprise small amounts of other materials often added into the support for stabilization of the surface area of the oxide support. This support material comprising mostly γ-alumina is desired because, in addition to being a good absorbent of NOx, it has high surface area, good adhesion and low chemical interaction with the precious metal loaded thereon.

The precious metal may be loaded onto the γ-alumina support material in any manner, several methods for providing precious metals on support materials being well known in the art. One particularly convenient method is by impregnating the support material with an aqueous or organic solvent solution comprising a soluble compound of the precious metal. Exemplary of soluble platinum (Pt) containing compounds, e.g., are compounds like chloroplatinic acid, amino-Pt-nitrates like tetramine platinum nitrate and Pt-carboxylates. Exemplary of such solvents are water, solution of alkalis like sodium hydroxide, ethanol, toluene, isopropyl alcohol, acetone, methylethylketone, butylacetate, and dimethylformamide, water and water/methanol being particularly preferred. Any precious metal compound which is soluble in an aqueous or organic medium and whose functional group is capable of being decomposed by heat to leave only the precious metal or its oxide on the support material may be employed in this impregnation technique. Hence, such a compound is called a precious metal precursor compound. Other platinum and other precious metal precursor compounds useful in this invention in addition to those listed above will be apparent to those skilled in the art in view of the present disclosure.

According to the method of impregnation disclosed above, the precious metal precursor compound is dissolved generally by simply mixing the compound into an aqueous or organic solvent to make a precursor solution thereof. A solution of the catalyst compound is generally further diluted for impregnation of the support. The catalyst precursor solution may also comprise a mixture of compatible organic solvents and/or precursor compounds.

For useful application in an exhaust system, the washcoat will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the support material may be applied to the substrate and then impregnated with the precious metal precursor catalyst solution. Alternately, the impregnated washcoat may be applied to the substrate. Generally, the washcoat (support material) is provided first on the substrate. Optimally, the washcoat is provided on the substrate in an amount of between about 20% and 35% by weight based on the weight of the substrate (e.g., monolith). Still other ways of providing the catalyst product will be apparent to those skilled in the art in view of the present disclosure, the method not being critical to the present invention. Preferably, a slurry of a platinum-impregnated washcoat is made into a slurry and the monolith is coated with it. When this material is subjected to elevated temperatures the functional group is decomposed and eliminated from the catalyst precursor. It may be further subjected to calcining.

If the heating is carried out in the air, the platinum compound may exist at a platinum oxide compound which at high temperatures generally decomposes to platinum and oxygen. Thus it often exists as a mixture of platinum and its oxides.

The support material is loaded such that the amount of precious metal is at least 0.1 wt. %, more preferably, between 0.1–5.0% by weight, based on the weight of the support. Preferably when platinum is used alone without other precious metals it comprises about 0.1–5.0 wt. %, mostly preferably about 2% wt.

According to the method of the present invention, at some of the relatively low temperatures experienced during diesel engine operation, as during start up, light accels and constant speed suburban driving, the NOx in the exhaust gas will be absorbed on the first catalyst component. In particular, for a typical platinum on alumina absorbent material this will take place when the oxidizing diesel exhaust gas is 50° to 230° C. In this embodiment, when the exhaust gas temperature is raised above 230° C., generally up to about 450° C. as during higher speed-load acceleration or cruise, the NOx desorbs from the absorbent and moves downstream in the exhaust gas passage. The specific temperature ranges of NOx storage and of NOx release of the first component catalyst in the present invention will depend on characteristics of its formulation as would be apparent to one skilled in the art in view of the present disclosure.

The desorbed NOx then is exposed to the second catalyst component at this elevated temperature where it is reduced, e.g. to $N_2$. At this elevated temperature the second component catalyst can efficiently carry out this reduction. This second catalyst component is any catalyst capable of reducing NOx, for example it may be a lean-NOx catalyst. Lean-NOx catalyst are well known in the art and are catalysts capable of reducing NOx, as well as oxidizing CO and HC, in the presence of excess oxygen. Exemplary of lean-NOx catalysts which use HC for the reduction reaction of NOx are Cu—ZSM-5, Fe—ZSM-5, Co—ZSM-5, and supported Rh. Alternately, the second component may be a SCR catalyst that reduces NOx through the use of urea or ammonia, rather than HC. Exemplary of SCR catalysts are base metal zeolites such as Cu—ZSM-5 or Ce mordenite. The invention method is not limited as to a particular catalyst for the second component as long as it performs the conversions described above. Since conventional lean-NOx catalysts reduce NOx generally by using HC in the exhaust gas, for diesel where the HC content of exhaust gas is relatively low, additional HC may be added over the lean-NOx catalyst. This may be done by injection diesel fuel, Fischer-Tropsch fuel, or other HC materials as would be apparent to those skilled in the art in view of the present disclosure. Another way to aid reduction of the NOx when SCR catalysts are used is to introduce urea or ammonia reductant or other materials over the second component as would be apparent to those skilled in the art in view of the present disclosure.

As disclosed above, for efficient use of the system of the present invention it may be desirable to monitor the amount of nitrogen oxides absorbed by the first component at lower temperatures so as to not exceed its absorbent capacity. If the exhaust gas temperature is lower than that necessary for efficient NOx conversion by the second component, NOx can be exhausted to the atmosphere. This monitoring may be done several ways including estimating the amount of generated nitrogen oxides for engine load-time information as by an on board computer, or by measuring the amount of nitrogen oxide concentration in the exhaust gas at positions before and after the nitrogen oxide absorbent material in the passage using, e.g., a nitrogen oxide sensor. Still other ways to monitor the amount of absorbed nitrogen oxide will be apparent to those skilled in the art in view of the present disclosure. When it is determined from this monitoring that the absorbent first component trap optimally should be purged of nitrogen oxides and regenerated, the temperature of the first component is exposed to elevated temperatures which desorb the NOx. This can be done by engine calibration. There is no criticality associated with the way in which the amount of nitrogen oxides in the trap are determined nor in the way the temperature is raised to purge the absorbent. The purging is generally carried out at a selected time compatible with engine operation and for a time necessary to purge some or all of the absorbed nitrogen oxide, as selected for optimal operation of the absorbent and the engine system. It may be desirable to vary these parameters and coordinate them with the absorbent temperature, etc., which may aid in purging. The stored NOx is then released from the absorbent material first component and is catalytically reduced over the catalyst of the second component catalyst. In general, the released NOx is efficiently converted to $N_2$ or $N_2O$.

Considering the alumina support, for example, our work shows that NOx is stored on the support, possibly as a nitrate. It is unstable at higher temperatures where it releases NOx. Experiments with platinum on $SiO_2$ showed no NOx storage to confirm the role of the alumina support as a NOx absorbent. Also, we find that $NO_2$, and not NO, can store and release on alumina without precious metal like platinum, but in lesser amount and over different temperature ranges than when Pt is present. The platinum appears to have two functions in the NOx storage mechanism: 1) it oxidizes NO to $NO_2$ which reacts with the alumina, and 2) it activates alumina in formation of an aluminum nitrate species. While this theory has been provided for an understanding of the unexpected results of the present invention, neither the truth nor understanding thereof is necessary for a practice of the present invention.

EXAMPLE 1

Storage-Release of NOx

A cordierite honeycomb monolith, containing 33% (by weight) gamma-alumina washcoat is impregnated with chloroplatanic acid solution to deposit 2% Pt (by weight, of the washcoat). The monolith is dried at 100° C. for five hours, and calcined at 500° C. for four hours. This is an example of an embodiment of the first catalyst component.

The sample is tested for NOx storage and release in a flow reactor. A piece that measures ¾" diameter×1" long is used. Prior to testing the sample piece is reduced with a $CO/N_2$ feed gas and then conditioned with the test feed gas. The feed gas composition is given below.
Feed Gas Composition
  NOx=85 ppm
  HC=0 ppm
  CO=720 ppm
  $H_2$=245 ppm
  $CO_2$=5.0%
  $H_2O$=4.6%
  $O_2$=14%
  $N_2$=balance
  Flow rate=3,600 cc/min The feed gas is brought into contact with the sample at 50° C. which is measured ½ inch before the inlet gas flow side. The flow reactor oven temperature is increased 15° C./min until the inlet sample temperature is 500° C.

The NOx storage efficiency and release as a function of inlet sample temperature is shown in FIG. 2. In this experiment, Pt/alumina shows storage over temperatures of 60–230° C. Peak storage efficiency of 80% is achieved near 160° C. NOx release is indicated by the negative values of storage efficiency that occur over temperatures of 230–450° C. The amount of NOx stored equals the amount released, within experimental error.

The stored amount of NOx is about 6 mg per $in^3$ of catalyst monolith. This amount is below NOx storage capacity which is not reached in this experiment. However, the amount of NOx stored is on a comparable level as that which a catalyst is exposed to during the urban driving portion of the MVEuro cycle, e.g., a 2.51 diesel Transit vehicle emits ca. 2.2 g NOx which exposes a 2.51 (153 $in^3$) catalyst to ca. 14 mg NOx per $in^3$ catalyst. Exposure time in the experiment is 10–12 min while NOx is storing. On the vehicle, the catalyst is exposed to exhaust for a similar time, 13–14 min, for the duration of MVEuro urban driving. It probably will not be necessary to be able to store all the engine-out NOx during the urban driving. This is because exhaust gas temperatures generally cycle through temperature ranges of both NOx storage and release.

EXAMPLE 2

Concurrent NOx Storage and NOx Reduction

The Pt/alumina monolith sample in Example 1 is tested for simultaneous occurrence of NOx storage and NOx reduction over the same temperature range. This is done by repeating the temperature ramp-up experiment in Example 1, except propylene is included in the feed gas composition. Two propylene feed gas levels are considered. They are 185 and 720 ppm $HC_1$, which result in 2/1 and 9/1 $HC_1/NOx$ ratios, respectively. Both of these feed compositions with the added hydrocarbons are still oxidizing. The former represents an average level for engine-out diesel exhaust, and the latter represents a typical level when reductant is added to diesel exhaust for operating a lean NOx catalyst.

Efficiency of NOx storage plus NOx conversion as a function of inlet sample temperature is shown in FIG. 2 for 2/1 $HC_1/NOx$, and in FIG. 3 for 9/1 $HC_1/NOx$. These figures show both NOx storage and NOx conversion occurring at temperatures below 230° C. Stored NOx is released above 230° C., indicated by the negative efficiency values. The amount of NOx released is less than the amount of NOx that disappears from the feed stream for temperatures below 230° C. NO measurements reveal that the residual amount of NOx that disappears, i.e., the amount that is not stored, is converted, for the most part, to $N_2O$. For the 2/1 $HC_1/NOx$, NOx conversion to $N_2O$ peaks to ca. 12–15% at 120° C., and for 9/1 $HC_1/NOx$, it peaks to ca. 45% at 140° C.

EXAMPLE 3

NOx Storage and Conversion of Released NOx

A two component catalyst system consisting of Pt/alumina followed by Cu zeolite (an embodiment of the invention second catalyst component) is examined in a flow reactor for NOx storage and conversion of released NOx. The Pt/alumina catalyst contacts feed gas first and is used to store NOx. This is the same catalyst sample used in Example 1. The Cu zeolite catalyst contacts feed gas after it passes through the Pt/alumina catalyst. This second position catalyst is used to convert NOx released from the Pt/alumina catalyst.

The Cu zeolite sample is a prototype lean NOx catalyst from a commercial catalyst supplier. A cordierite honeycomb monolith supports the Cu zeolite material. Dimensions of the Cu zeolite sample are ¾" diameter×2" long. This sample is tested for NOx conversion with the Pt/alumina sample absent. Temperature ramp up procedure in Example 1 is performed. Feed gas composition is also the same as Example 1 except 185 ppm NOx and 1345 ppm $HC_1$ are used. FIG. 4 shows NOx conversion over the Cu zeolite catalyst as a function of temperature measured at the location that is inlet for the Pt/alumina catalyst but without it present. (Inlet temperature for the Cu catalyst, i.e., ½" in front of it, happens to be ca. 25° C. higher than that in front of the Pt/alumina catalyst in this experimental apparatus.) Comparison of FIG. 4 with FIG. 2 shows NOx conversion over this Cu zeolite catalyst coincides with NOx release over Pt/alumina in the experimental set-up.

Figure 5:
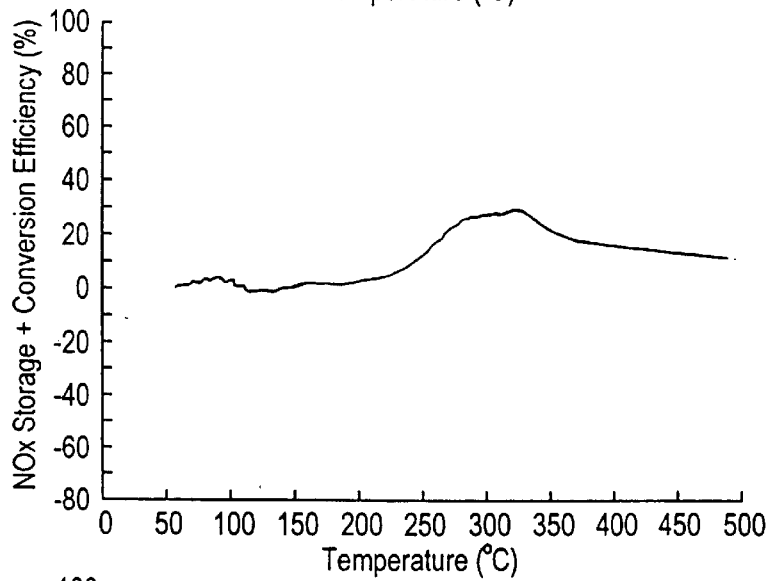
FIG. 5 is a graph showing NOx conversion efficiency over a lean-NOx catalyst useful in an embodiment of the present invention as the second component.
Figure 6:
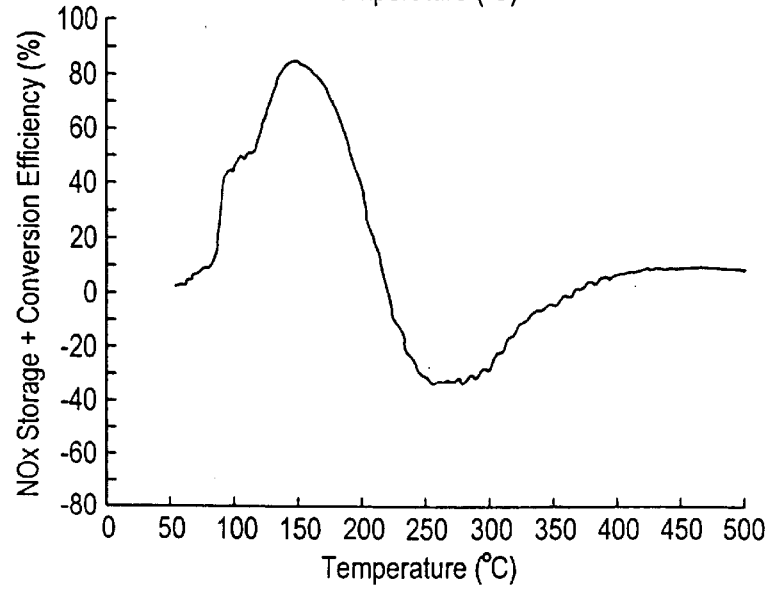
FIG. 6 is a graph showing NOx storage and conversion of released NOx for a two-component system according to an embodiment of the present invention.

NOx conversion for the two component catalyst system, i.e., Pt/alumina followed by Cu zeolite, is shown in FIG. 5. The Pt/alumina catalyst is exposed to the same feed gas containing no HC as Example 1, so it provides NOx storage-release and no NOx conversion. Propylene is added before the Cu catalyst, i.e., after the Pt/alumina. A HCL/NOx ratio of 15/1 is used based on the feed gas level of NO for the Pt catalyst. This high ratio is to accommodate the increase in NOx feed gas level over Cu zeolite that results from Pt/alumina releasing NOx.

Comparison of FIG. 5 with FIG. 4 shows that when the Pt/alumina storage catalyst precedes the Cu zeolite catalyst, overall net NOx conversion improves over that of the Cu zeolite alone. The improvement is from Cu zeolite converting NOx stored at the lower temperatures on Pt/alumina.

We claim:

1. An exhaust gas treatment system for diesel engine exhaust, said system comprising:
   a first catalyst component located in an exhaust gas passage of a diesel engine comprising a nitrogen oxide absorbent material upstream of a second catalyst component comprising a lean-NOx catalyst or a selective reduction catalyst, said nitrogen oxide absorbent material consisting essentially of:
   (a) a porous support material of alumina, and
   (b) at least 0.1 wt. % precious metal based on the weight of the porous support material selected from the group consisting of platinum, palladium, and rhodium, or a mixture of any of them;
   wherein said diesel exhaust gas flowing into said first catalyst component is always oxidizing and at low temperatures said porous support material of said first catalyst component absorbs nitrogen oxides from the exhaust gas through the catalytic effect of said precious metal and releases NOx gases at higher temperatures where they are converted to nitrogen or nitrous oxide over the second catalyst component.

2. The system according to claim 1 wherein said precious metal comprises about 0.1–5.0 wt. %.

3. The system according to claim 1 wherein said precious metal comprises platinum.

4. The system according to claim 1 wherein said porous support material comprises gamma-alumina.

5. The system according to claim 1 wherein said porous support material further includes stabilizers.

6. The system according to claim 1 wherein said first catalyst component is carried on a substrate selected from cordierite, metals or ceramic.

7. The system according to claim 6 wherein said substrate carries about 20–35 weight percent porous support material loaded with precious metal.

8. A method for treating exhaust gases generated by a diesel engine, said method comprising the steps of:
   locating in an exhaust gas passage of a diesel engine a first catalyst component comprising a nitrogen oxide absorbent material capable of absorbing nitrogen oxides at low temperatures and a second catalyst component downstream of said first catalyst component comprising a lean-NOx catalyst or selective reduction catalyst, said nitrogen oxide absorbent material consisting essentially of:
   (a) a porous support material of alumina, and
   (b) at least 0.1 wt. % precious metal based on the weight of the porous support material selected from the group consisting of platinum, palladium, and rhodium, or a mixture of any of them;
   exposing said first catalyst component to oxidizing diesel exhaust gases, where at low temperatures nitrogen oxides are absorbed from the exhaust gas by said porous support material through the catalytic effect of said precious metal and at higher temperatures are desorbed and passed to the second catalyst component where the nitrogen oxides are reduced to nitrogen or nitrous oxide.

9. The method according to claim 8 wherein said precious metal comprises about 0.1–5.0 wt. %.

10. The method according to claim 9 wherein said precious metal comprises platinum.

11. The method according to claim 9 wherein said porous support material comprises gamma-alumina.

12. The method according to claim 9 which further comprises monitoring the absorption of the nitrogen oxide on said nitrogen oxide absorbent material.

13. The method according to claim 9 wherein said porous support material of said first catalyst component is carried on a substrate selected from cordierite, metals or ceramic.

14. The method according to claim 13 wherein said substrate carries about 20–35 weight percent porous support material loaded with precious metal.

15. The method according to claim 9 which further comprises injecting a source of material selected from the group consisting of hydrocarbons, ammonia or urea prior to the second catalyst component at temperatures that are at and above its light-off temperature.

* * * * *